July 14, 1964 M. WASSERMAN 3,141,107

ELECTROLUMINESCENT DEVICE WITH NON LINEAR RESISTANCE

Filed April 15, 1960

INVENTOR
MOE WASSERMAN
BY Theodore Jay Jr.
ATTORNEY

United States Patent Office 3,141,107 Patented July 14, 1964

3,141,107

ELECTROLUMINESCENT DEVICE WITH NON LINEAR RESISTANCE

Moe Wasserman, Massapequa Park, N.Y., assignor to General Telephone and Electronics Laboratories, Inc., a corporation of Delaware
Filed Apr. 15, 1960, Ser. No. 22,478
6 Claims. (Cl. 313—108)

My invention relates to electroluminescent display devices.

I have invented a new type of electroluminescent display device which, in response to an incoming electrical signal of variable value, produces a line of light displayed against a dark background, the length of the line of light changing in accordance with changes in signal value. Such a device finds many applications in electronics, for example, when electrical parameters such as current or voltage values are to be displayed and compared in the form of bar graphs. Further, my device can be substituted for certain electromechanical indicating mechanisms, such as tachometers.

In accordance with the principles of my invention, I provide a plurality of electroluminescent cells and a like plurality of non-linear resistors. Each resistor is connected in series with a corresponding cell to form a like plurality of series circuits. An incoming electrical signal of variable value is supplied to all of the paralleled circuits. Each circuit is designed to respond to the incoming signal in such manner that when the signal falls below a predetermined threshold value the electroluminescent cell in this circuit will be dark. However, when the signal equals or exceeds this threshold value, the electroluminescent cell will be energized and emit light.

The cells of all the circuits are placed in a line. Each circuit is designed to have a threshold value which is higher than that of the immediately preceding cell and which is lower than that of the immediately succeeding cell. Thus, as the incoming signal changes value, one or more cells emit light, thus forming a line of light which changes length as the signal value changes.

Each non-linear resistor has a voltage-current characteristic at which the current flowing therethrough varies as the Nth power of voltage applied across the resistor, where N can be as high as 16. Hence, when the voltage across such a resistor is low, the resistor exhibits a high impedance. As the applied voltage increases, the impedance of the resistor decreases extremely rapidly. The voltage value at which this change of impedance occurs is a threshold value and determines the threshold value for each of the paralleled circuits. The different threshold values required for the various circuits are obtained by suitably selecting the threshold values for the non-linear resistors used.

The structure described above uses separate electroluminescent cells and non-linear resistors. These separate elements can be formed into an integral structure which will function in the same manner as indicated above. For example, one such structure can comprise a sandwich-like structure having in the order named a transparent conductive film, an electroluminescent layer applied over the film; a layer of non-linear material applied over the electroluminescent layer, the non-linear layer having a non-uniform cross-section taking the shape of a staircase; and an electrode applied over the non-linear layer. The incoming signal is applied between the film and the electrode, each tread of the non-linear layer, together with the portions of the film, electrode and electroluminescent layer in registration therewith, constituting a separate series circuit as previously described.

Illustrative embodiments of my invention will not be described with reference to the accompanying drawings wherein.

Figure 1:
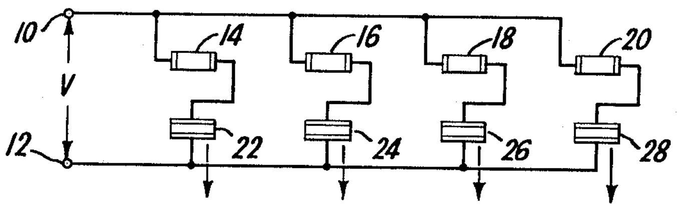
FIG. 1 shows one form of my invention.

Referring to FIG. 1, there is shown a plurality of electroluminescent cells, in this example four electroluminescent cells 22, 24, 26 and 28 and a like plurality of non-linear resistors 14, 16, 18, and 20. Each cell is connected in series with its corresponding resistor between terminals 10 and 12. An alternating voltage V is applied between these terminals.

Each non-linear resistor is constituted of a layer of non-linear material having electrodes at opposite ends thereof. Each resistor responds to a different threshold value of applied voltage in the manner previously described. The threshold value of resistor 14, for example, can be 40 volts, that of resistor 16 65 volts, that of resistor 18 90 volts, and that of resistor 20 115 volts. In the device of FIG. 1 these various threshold values are obtained by varying the length of the non-linear layer, i.e. changing the electrode separation and changing the length of the layer accordingly. As the length increases, the threshold value likewise increases.

The various electroluminescent cells have essentially the same characteristics. As a consequence, when V is 100 volts R.M.S. cell 11 is lit and cells 24, 26 and 28 are dark. When V is 150 volts r.m.s., cells 22 and 24 are lit and cells 26 and 28 are dark. When V is 200 volts R.M.S., cells 22, 24 and 26 are lit and cell 28 is dark. When V is 250 volts R.M.S., all the cells are lit.

Figure 2:
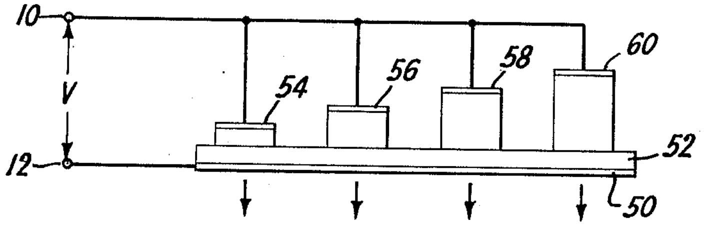
FIG. 2 shows another form of my invention.

Referring now to FIG. 2, there is shown a single electroluminescent layer 52, one surface of which is coated with a transparent electrically conductive film 50. Film 50 is directly connected to terminal 12.

Four separate electrically non-linear layers 54, 56, 58 and 60 are applied over the electroluminescent layer 52. The end of each layer remote from layer 52 is connected through an electrode to terminal 10. Each of the non-linear layers together with the associated portion of the electroluminescent layer 52 constitutes a series circuits in the same manner as in FIG. 1. As a result the devices of FIG. 1 and FIG. 2 function in the same manner.

It is to be noted that the different threshold voltage values of the non-linear elements of FIG. 2 are obtained by varying the thickness of layers 54, 56, 58 and 60, these values increasing with increasing thickness.

Figure 3:
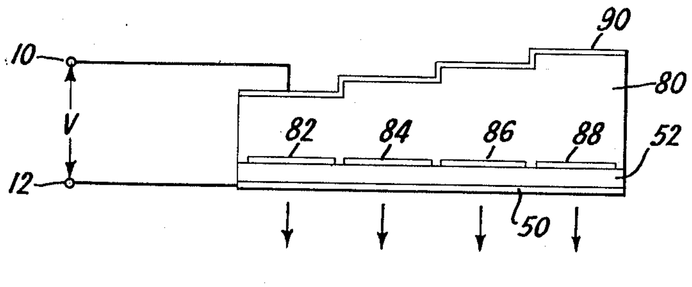
FIG. 3 shows still another form of my invention.

Referring to FIG. 3, there is shown a device similar to FIG. 2 except that a single staircase shaped non-linear layer 80 is used in place of the layers 54, 56, 58 and 60 of FIG. 2. The devices of FIGS. 2 and 3 in the same manner.

However, when the layer 80 of FIG. 3 has a large area, small local variations in the composition of the layer (which, for example, can be composed of cadmium sulfide embedded in glass as disclosed in more detail in my copending Patent S.N. 2,937,353, issued May 17, 1960) can produce local potential gradients which create variations in the intensity of the emitted light. To insure uniform intensity, separate electrically conductive area type electrodes 82, 84, 86, and 88 can be interposed between appropriate portions of the non-linear layer 80 and the electroluminescent layer 52. Such area electrodes form equi-potential surfaces which eliminate local potential gradients and thus permit the emission of light of uniform intensity.

Additional information on the composition of certain electrically non-linear layers and resistors as well as methods for producing same can be found in my above mentioned copending application. Additional information on the composition of composite non-linear and electroluminescent layers can be found in another copending application Serial No. 10,728 filed February 24, 1960.

What is claimed is:

1. An electroluminescent device comprising a plurality of electroluminescent cells, a like plurality of non-linear resistors having different electrical characteristics, each resistor being connected in series with a corresponding cell to form a like plurality of series circuits, means connecting said circuits in parallel, and means to apply a variable signal to all of said parallel connected circuits, said electrical characteristics having values at which each cell is energized at a different threshold voltage level.

2. An electroluminescent device comprising a plurality of electroluminescent cells, a like plurality of non-linear resistors, each resistor comprising a non-linear layer subtended between two electrodes, the length of the subtended layer being different for each resistor, each resistor being connected in series with a corresponding cell to form a like plurality of series circuits, and means connecting said circuits in parallel.

3. An electroluminescent device comprising a conductive film; an electroluminescent phosphor layer of uniform cross section applied over said film; an electrically non-linear layer applied over said phosphor layer, said non-linear layer having a non-uniform cross section taking the shape of a staircase; an electrode applied over said non-linear layer; and a matrix of separate electrically conductive elements interposed between said layers, each element being in registration with a corresponding tread of said staircase.

4. An electroluminescent device comprising a conductive film, a plurality of separate coplanar electroluminescent phosphor layer elements applied over said film, said electroluminescent elements having uniform thickness; a like plurality of separate electrical non-linear layer elements applied over said electroluminescent elements, each non-linear element being in registration with a corresponding electroluminescent element, the thickness of said non-linear elements varying one from another; and a like plurality of electrodes, each electrode being applied over a corresponding non-linear element, said electrodes being electrically interconnected.

5. An electroluminescent device comprising a conductive film; an electroluminescent layer applied over said film; a plurality of separate electrically non-linear layer elements applied over said electroluminescent layer, the thicknesses of said non-linear elements varying one from another; and a like plurality of electrodes, each electrode being applied over a corresponding non-linear element, said electrodes being interconnected.

6. An electroluminescent device comprising a conductive film; an electroluminescent layer applied over said film; a plurality of separate electrically non-linear layer elements applied over said electroluminescent layer, the thicknesses of said non-linear elements varying one from another; a like plurality of electrodes, each electrode being applied over a corresponding non-linear element, said electrodes being interconnected; and a like plurality of separate electrically conductive elemental areas, each area being interposed between the electroluminescent layer and a corresponding element and in registration with a corresponding electrode.

References Cited in the file of this patent

UNITED STATES PATENTS

| | | |
|---|---|---|
| 2,755,457 | Diemer et al. | July 27, 1956 |
| 2,877,371 | Orthuber et al. | Mar. 10, 1959 |
| 2,886,731 | Zappacosta | May 12, 1959 |
| 2,942,131 | Diemer et al. | June 21, 1960 |

FOREIGN PATENTS

| | | |
|---|---|---|
| 1,117,682 | France | Feb. 27, 1956 |